Feb. 17, 1953 — J. E. GRIFFITH — 2,628,792
AIRCRAFT ADAPTER FOR AIR, LAND, AND WATER TRAVEL
Filed Sept. 5, 1950 — 6 Sheets-Sheet 3

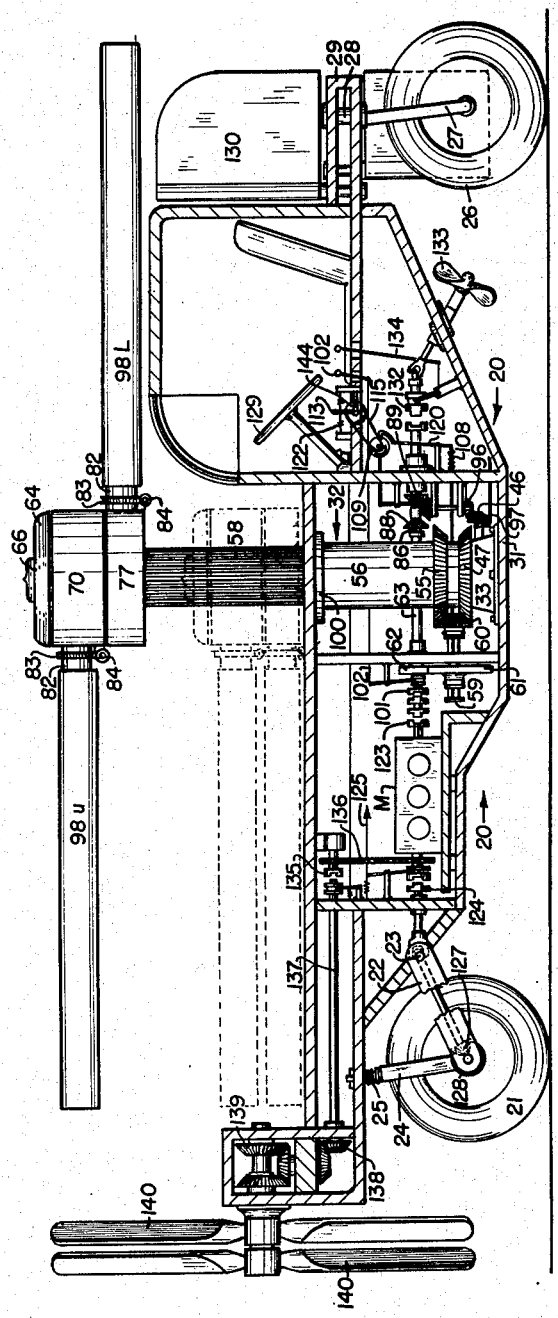
Fig. I
Inventor
JAMES E. GRIFFITH
By Anderson & Mueller
Attorneys

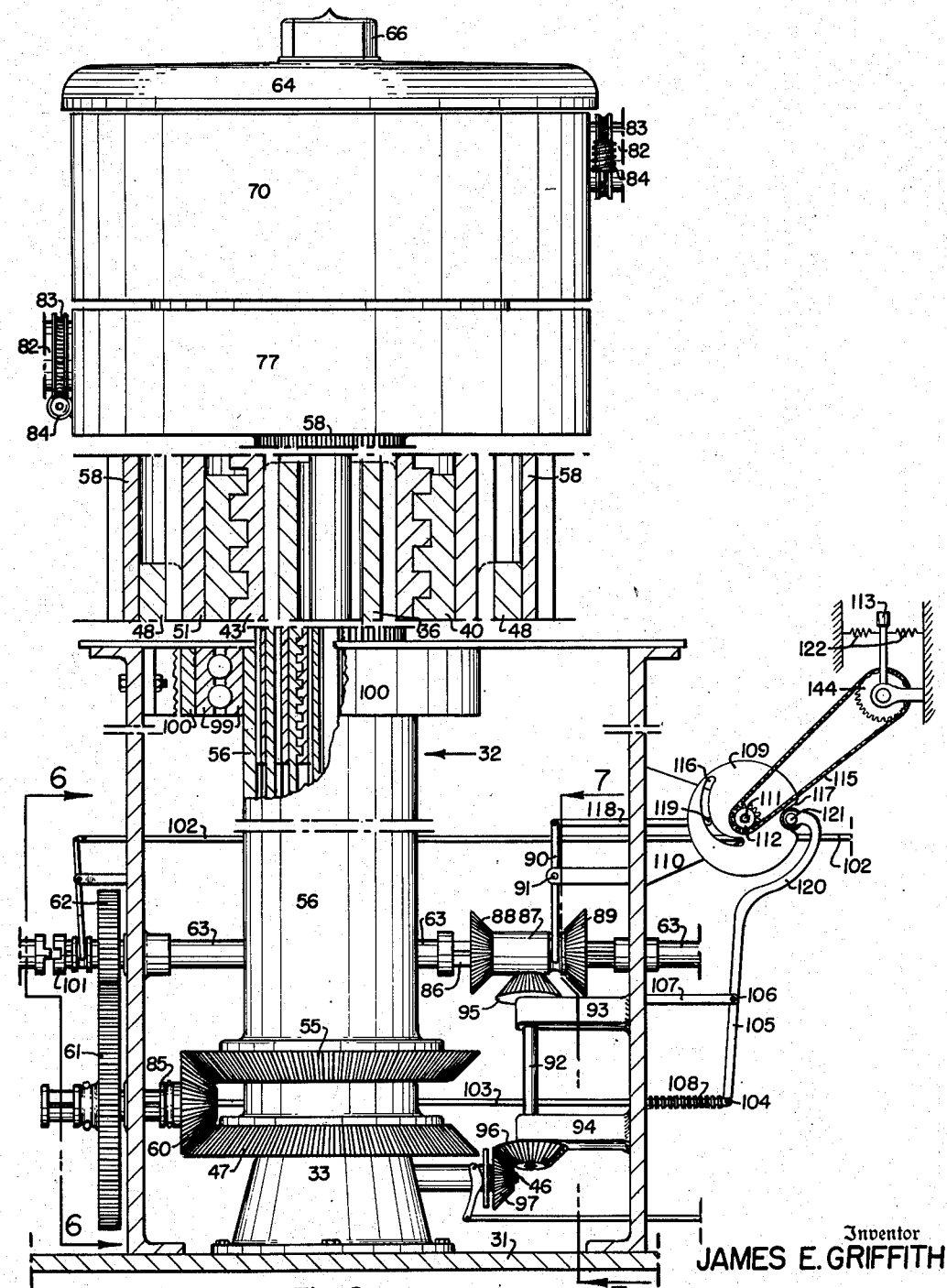

Inventor
JAMES E. GRIFFITH
By Anderson & Mueller
Attorneys

Feb. 17, 1953 J. E. GRIFFITH 2,628,792
AIRCRAFT ADAPTER FOR AIR, LAND, AND WATER TRAVEL
Filed Sept. 5, 1950 6 Sheets-Sheet 4

Inventor
JAMES E. GRIFFITH
By Anderson & Muller
Attorneys

Feb. 17, 1953 J. E. GRIFFITH 2,628,792
AIRCRAFT ADAPTER FOR AIR, LAND, AND WATER TRAVEL
Filed Sept. 5, 1950 6 Sheets-Sheet 5
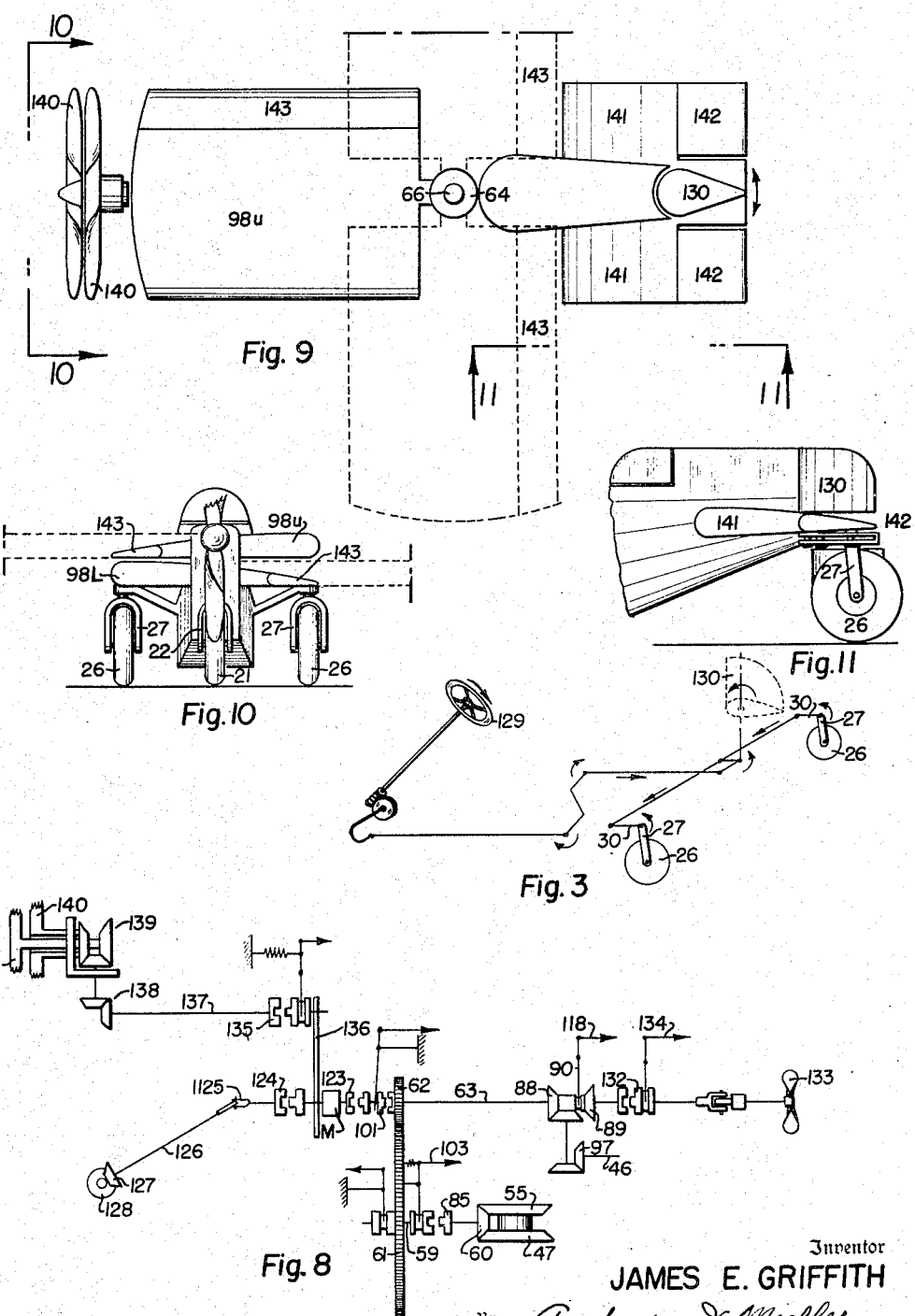
Inventor
JAMES E. GRIFFITH
By Anderson & Mueller
Attorneys Feb. 17, 1953     J. E. GRIFFITH     2,628,792
AIRCRAFT ADAPTER FOR AIR, LAND, AND WATER TRAVEL
Filed Sept. 5, 1950     6 Sheets-Sheet 6
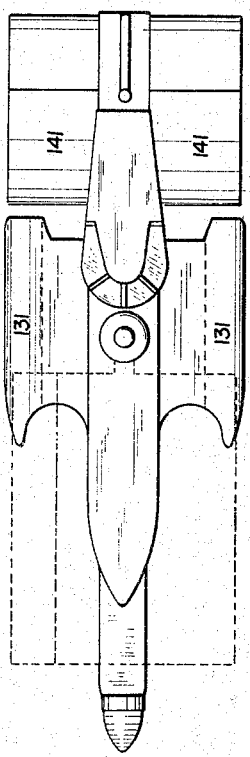
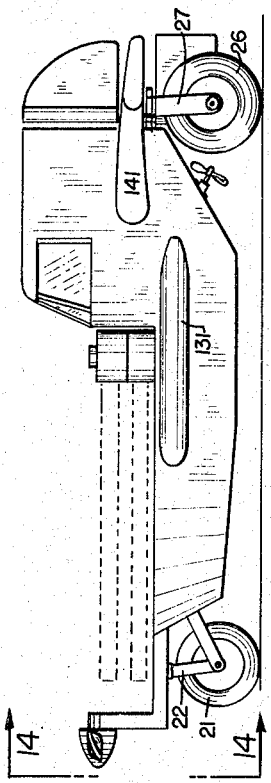
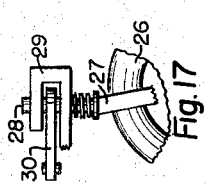
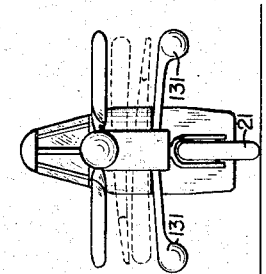
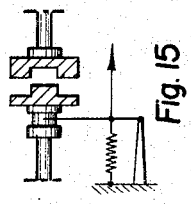
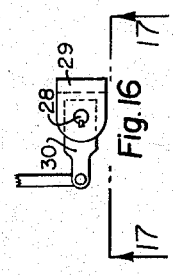
Inventor
JAMES E. GRIFFITH
By Anderson & Mueller
Attorneys Patented Feb. 17, 1953

2,628,792

UNITED STATES PATENT OFFICE 2,628,792

AIRCRAFT ADAPTED FOR AIR, LAND, AND WATER TRAVEL

James Eidson Griffith, Denver, Colo.

Application September 5, 1950, Serial No. 183,170

10 Claims. (Cl. 244—7)

This invention relates to improvements in heavier-than-air airships that are adapted to travel in the air and on both land and water.

It has been proposed to construct airships of such design and construction that they can travel on the ground, in the air and on the water. As an example of such a machine attention is directed to United States Letters Patent No. 1,267,384, May 28, 1918.

It is the object of this invention to produce a machine of the class indicated that shall be of a simple and substantial construction, so designed that it shall have great strength and a large capacity per unit weight.

A further object is to produce a device of the class indicated, in which the lifting blades are so constructed and designed that they may serve as wings when the machine is operated as an ordinary airplane.

A further object is to produce a machine in which the blades may be raised to a point above the pilot cabin when they are employed for lifting the machine, and in which the blades may be lowered to a position below the window of the pilot cabin when the machine functions as an ordinary airplane, a ground vehicle or as a water vehicle.

A further object is to produce a mechanism for transmitting power to the lifting blades for turning the same, for raising and lowering them and for releasing them for free manual adjustment.

A further object is to produce a machine having lifting blades constructed like ordinary airplane wings and to provide manually operable means for adjusting the angle of attack, the blades being provided with ailerons adjustable while in operation.

The above and any other objects that may become apparent as the description proceeds are attained by means of a construction and arrangement of parts that will now be described in detail, for which purpose reference will be had to the accompanying drawings in which the invention has been illustrated, and in which:

Figure 1 is a view in the nature of a diagram, showing a longitudinal vertical section, and is intended to illustrate the general arrangement of the parts;

Figure 2 is an enlarged side elevation of the lifting propeller operating mechanism, partly broken away, showing the parts to a somewhat larger scale than in Figure 1;

Figure 3 is a diagram showing the steering mechanism for land travel and for the horizontal aerial rudder control;

Figure 8 is a diagram showing the manner in which power is distributed from the motor to the several driven parts;

Figure 9 is a top plan view of the vehicle showing by full lines the manner in which the lifting blades are arranged for land and water travel, and by broken lines their position when the device is operating as an ordinary airplane;

Figure 10 is a front end elevation looking through plane 10—10, Figure 9;

Figure 11 is a fragmentary side elevation looking through plane 11—11, Figure 9;

Figure 12 is a top plan view showing the machine provided with pontoons for water travel;

Figure 13 is a side elevation of the machine looking upwardly in Figure 12;

Figure 14 is a front elevation looking through plane 14—14, Figure 13;

Figure 15 is a view showing the general arrangement of parts employed in the several shaft connectors or clutches; and Figures 16 and 17 are top plan and side elevation showing the steering wheel operating means.

Figure 4:
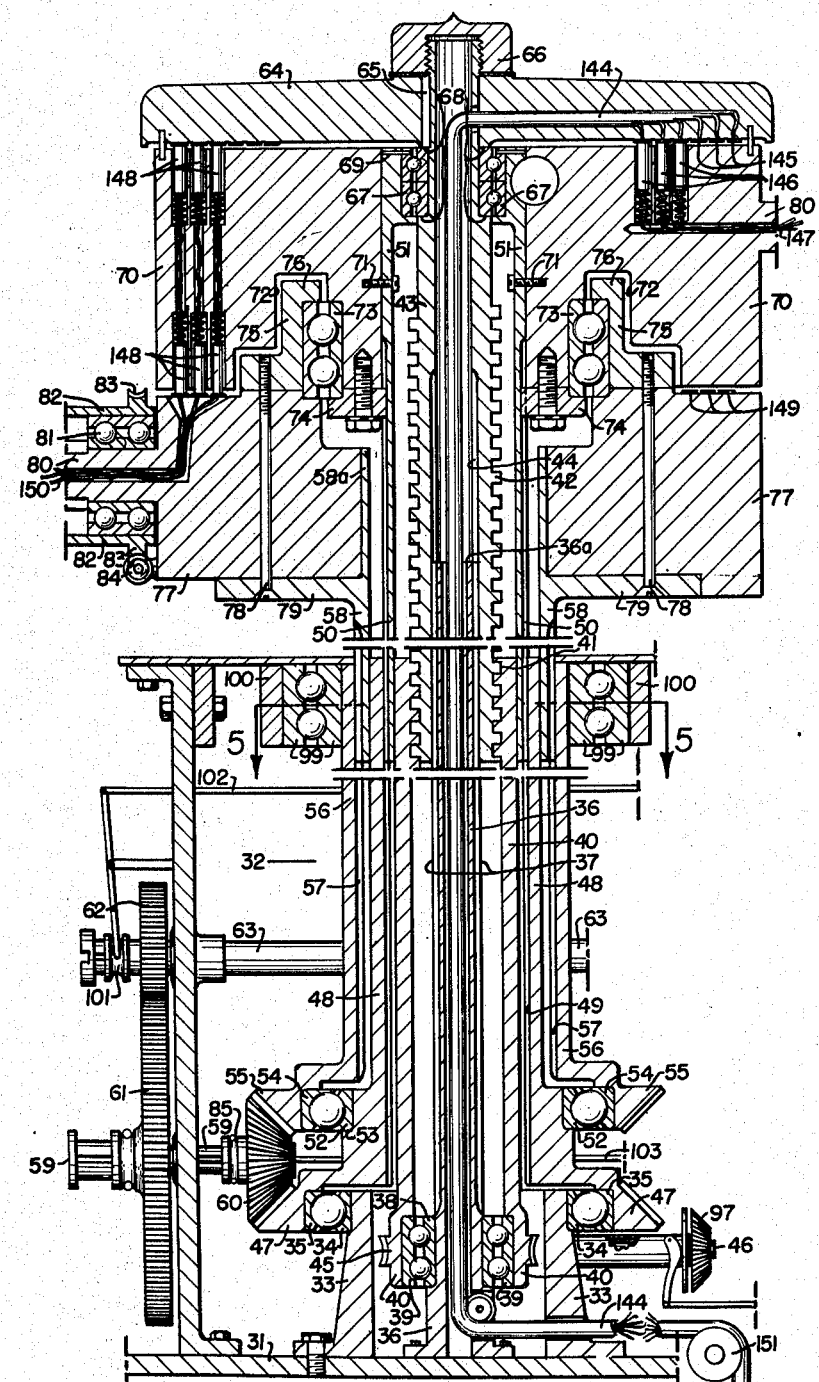
Figure 4 is a vertical diametrical section through the lifting propeller mechanism, the section being taken on a vertical longitudinal plane of the airship.
Figure 5:
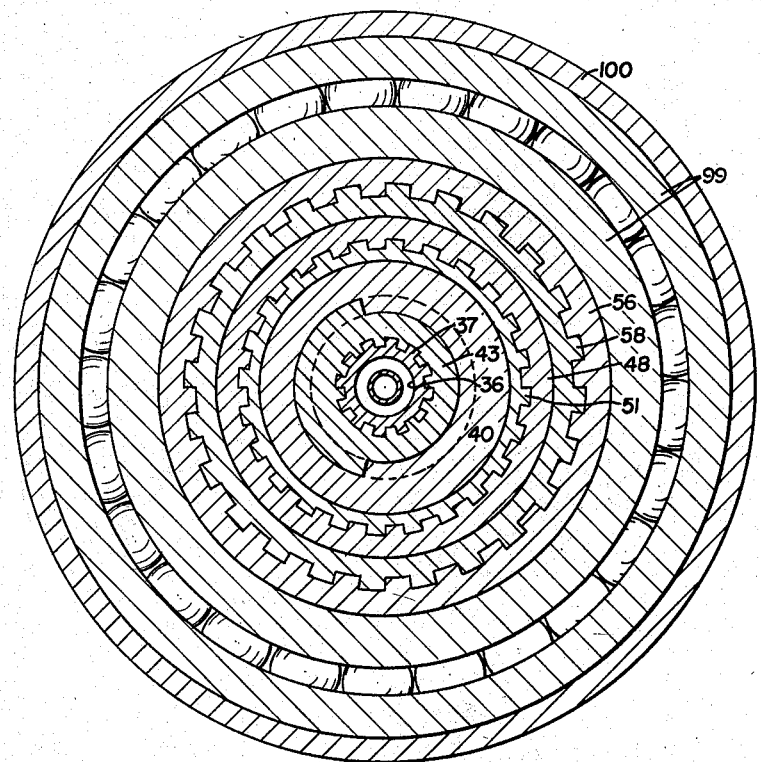
Figure 5 is a section taken on line 5—5, Figure 4.
Figure 6:
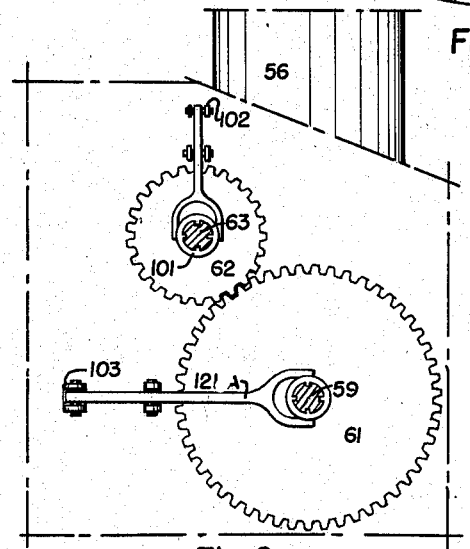
Figure 6 is an elevational view looking through plane 6—6, Figure 2.
Figure 7:
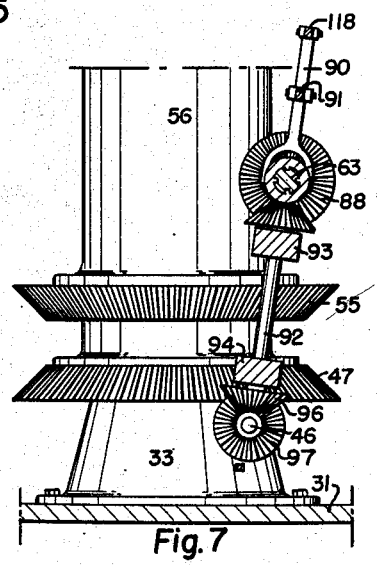
Figure 7 is a section taken on line 7—7, Figure 2.

In the drawing, reference numeral 20 designates the frame as a whole. The construction of the frame will not be described in detail, as it is merely illustrative and therefore only such parts will be specifically mentioned and designated as perform some specific function.

The frame illustrated has a single front wheel 21 mounted in fork 22 which is pivoted at 23. A fork 24 extends upwardly and abuts spring 25. The rear end of the frame is supported on two laterally spaced wheels 26 mounted in forks 27 whose upper ends are provided with pivots 28 journaled in suitable bearings in the reversely bent end 29 of the frame. Crank arms 30 extend from the pivots as shown in Figures 16 and 17. The means for steering wheels 26 has been shown diagrammatically in Figure 3, to which reference will be made hereinafter.

The power is derived from motor M that is supported from the frame somewhat as shown in Figure 1. The frame has a flat support surface 31 from which the lifting blade driving mechanism 32 extends upwardly. This will now be described.

Referring now more particularly to Figures 1, 2, 4, 5, 6, 7 and 7a, it will be observed that the lifting blade driving mechanism comprises a base 33 that is firmly bolted to the frame element 31 and carries at its upper end an inner ball race 34. The outer ball race has been designated by reference numeral 35. Secured to frame element 31 in a position concentric with base 33 is an elongated tubular member 36 whose outer surface is provided with splines 37. Member 36 terminates at 36a as shown in Figure 4. The lower end of member 36 has attached thereto an inner ball race 38. The outer ball race has been designated by reference numeral 39 and is attached to the inner surface of tubular member 40 whose inner surface is provided near its upper end with a short section of square threads 41 that cooperate with similar threads 42 on the outer surface of tubular member 43. The inner surface of member 43 has longitudinal splines 44 that engage splines 37 on the outer surface of tubular member 36. It is now evident that tubular member 43 can move longitudinally on member 36, but cannot rotate relative thereto. The lower end of member 40 is provided with a worm gear 45 that is engaged by a worm on shaft 46. The worm has not been shown because it is located to the rear when viewed as in Figure 4. When shaft 46 is rotated tubular member 40 will turn, and since member 43 cannot turn it must move longitudinally in response to the action of the threads.

The outer ball race 35 is positioned in a recess on the inner surface of bevel gear 47 which is integral with tubular member 48, and is therefore supported by bearing 34, 35 which may be of the combined radial and thrust type as shown. The inner surface of member 48 has splines 49 that cooperate with splines 50 on tubular member 51.

Inner ball race 52 is supported on a shoulder 53 and the outer ball race 54 supports bevel gear 55 and the outermost tubular member 56 of the assembly. The inner surface of member 56 has longitudinal splines 57 that cooperate with the splines on the outer surface of tubular member 58. Shaft 59 carries a bevel pinion 60 that engages both bevel gears 47 and 55 and constrains them to turn in opposite directions. Shaft 59 carries a spur gear 61 that meshes with gear 62 on shaft 63. The driving mechanism will be described in greater detail hereinafter.

Referring now principally to Figure 4, it will be observed that a cap 64 is secured to the upper end of tubular member 43 and is held from rotating thereon by a key 65 or other means such as splines. The top of member 43 is closed by a cap 66. Combined radial and thrust ball bearings 67 are supported on member 43 and rest on shoulder 68. Member 51 is secured to the outer races of bearings 67 and is held against longitudinal and rotary movement relative to the bearing by suitable means, such, for example, as by pins 69. A cylindrical lifting blade hub 70 is attached to tubular member 51 by any suitable means such as pins or tap bolts 71 and consequently moves as a unit with member 51. The under surface of hub 70 has an annular recess 72 of the cross sectional shape shown. A ball bearing has its inner race 73 seated in the recess and held in place by ring 74. A ring 75 of Z-shaped cross section surrounds the outer race of the ball bearing and its upper end 76 laps the upper end of the outer ball race.

A cylindrical hub 77 is attached to ring 75 by bolts 78 and may therefore be rotated relative to hub 70. It will be observed that tubular member 58 has a flange 79 that is secured to hub 77 by the bolts 78 and is also provided with a cylindrical extension 58a that fits the central opening in hub 77. Hubs 70 and 77 have short radial lugs 80 on which are mounted elongated ball or roller bearings 81 to the outer ball races of which are attached the tubular root portions 82 of the lifting blades or propellers which are provided on their outer surfaces with worm gear teeth 83 with which worms 84 cooperate for manually effecting angular adjustment of the blades.

Shaft 59 is provided with a mechanism 85 by means of which pinion 60 can be connected to or disconnected from gears 47 and 55. Shaft 63 has a splined portion 86 (Figure 2) on which is mounted a cylindrical hub 87 that is provided at its ends with bevel gears 88 and 89. Hub 87 has a groove for the reception of the fingers at the lower end of shifting lever 90 that is pivoted at 91 to the outer end of the supporting bracket as shown. Shaft 92 is rotatably mounted in bearings in brackets 93 and 94. The upper end of shaft 92 carries a bevel gear 95 positioned to be engaged by either one of gears 88 or 89. When hub 87 is in its neutral position gears 88, 89 will rotate out of engagement with gear 95. Secured to the lower end of shaft 92 is a bevel gear 96 that is constantly in operative engagement with gear 97 on shaft 46. The position of hub 87 and gears 88, 89 is controlled by means that will be hereinafter described.

When shifting device 85 holds pinion 60 in open or inoperative position tubular members 48 and 56 may be freely relatively rotated and the helicopter blades 98U and 98L may then be turned in any direction relative to each other.

Let us now assume that the helicopter blades are in the full line position (Figure 1) and that they are to be folded and moved down to the dotted line position. Shifting device 85 is operated to disconnect pinion 60 from gears 47, 55, after which blade 98L can be moved into a position directly under blade 98U. Shaft 46 is now turned in such a direction that tubular member 40 will rotate and move member 43 downwardly by the action of threads 41 and 42 until the blades reach the desired position.

Attention is called at this point to a ball bearing 99 positioned between ring 100 and tubular member 56 to steady the latter during the operation of the propellers.

From Figure 1 it will be seen that the motor shaft is separated from shaft 63 by a clutch 101 that is controlled by lever 102 and suitable linkages. Bevel gears 88 and 89 are normally out of engagement with gear 95 as shown in Figure 2, to which reference will now be had for the purpose of further detailed explanation.

It has already been explained that in order to fold the blades 98U and 98L, bevel pinion 60 should be moved out of engagement with gears 47 and 55, which is effected by means illustrated in Figures 2 and 4, to which reference for this purpose will now be had. A rod 103 is connected with the usual shifting fork that is used for moving pinion 60 into and out of engagement with gears 47 and 55. The end of rod 103 is pivoted at 104 to the lower end of lever 105 that is pivoted at 106 to the outer end of bracket 107. A spring 108 surrounds the end of rod 103 and is under compression and therefore tends to hold pinion 60 in operative engagement with gears 47 and 55.

It is evident that gears 47 and 55 must not be rotated by power when tube 40 is rotated by the worm wheel 45 and means has therefore been provided for automatically moving pinion 60 to inoperative position before either gear 88 or 89 is moved into engagement with gear 95. A means for effecting the purpose indicated has been shown diagrammatically in Figure 2. A cam 109 is supported on bracket 110 and mounted for rotation on shaft 111. A sprocket wheel 112 is attached to the cam. The cam is rotated by means of a handle 113 secured to sprocket wheel 114 which is operatively connected with sprocket wheel 112 by means of a sprocket chain 115. Handle 113 is located so as to be within easy reach of the pilot. It will be observed that the cam has a cam slot 116 and a notch 117. Shifting fork 90 has attached to its upper end a link 118 whose outer end carries a roller 119 that is positioned in the cam slot 116. Lever 105 terminates at its upper end in a hook 120 having a roller cam follower 121. With the parts in the position shown gears 88, 89 are in neutral position and pinion 60 is in engagement with gears 47 and 55. When the pilot turns cam 109 in either direction roller 121 moves out of the notch to the periphery of the cam disk and disconnects pinion 60 from gears 47 and 55. A further rotary movement of the cam moves either gear 88 or 89 into engagement with gear 95, permitting tube 40 to turn and move tube 43 upwardly or downwardly, depending on which of gears 88 or 89 are in engagement with 95. Since the parts move slowly the pilot has no difficulty in releasing handle 113 at the end of the desired movement and springs 122 or equivalent means returns gears 88, 89 to neutral positions. Before the lifting blades are raised or lowered the shifting mechanism comprising shifting fork 121A (Figure 6) that controls the position of gear 61 is operated to move gear 61 out of engagement with gear 62, and therefore gear 61 will not be rotating when pinion 60 moves into position where it engages 47 and 55. Attention is called to the fact that notch 117 is angularly narrow and has steep sides, whereas cam slot 116 must move through a considerable angle before gear 88 or 89 can engage 95, and therefore gear 97 cannot start rotating until after pinion 60 has been moved to inoperative position and will cease rotating before pinion 60 moves back to operative position, which makes it possible by latching handle 113 in either of positions P or P' to manually turn the helicopter blades from operative to inoperative or from inoperative to operative position while pinion 60 is in inoperative position.

Motor M is provided at its rear end with a clutch 123 which is latched in open position when the machine travels over the ground as an automobile or in the air as an airplane. Since clutch 123 is not necessarily operated except when changing from a land vehicle or ordinary airplane to a helicopter or a water vehicle, no means has been provided for operating it from the pilot seat.

When the machine is to be used as a land vehicle, clutch 123 is opened and clutch 124 at the front of the motor is closed, a cable 125 being provided as part of the clutch operating means. From clutch 124 a shaft extends to the universal 1125, located in line with pivot 23, from which shaft 126 extends to bevel pinion 127 that is in operative engagement with bevel gear 128 that is fastened to wheel 21. Wheel 21 now becomes a traction wheel and wheels 26 the steering wheels. The steering gear is outlined diagrammatically in Figure 3 where the steering wheel has been designated by 129 and the vertical air rudder by 130.

Let us now consider the case where the machine is to operate as a boat. In this case the fuselage is provided with removable pontoons 131. Clutch 124 is opened and clutch 132 is closed, whereupon propeller 133 is caused to turn and propel the machine in the manner of a boat. No attempt has been made to show the actual means for operating the various clutches, but means have been indicated diagrammatically in Figure 1 where lever 134 has been shown as connected with clutch 132. A typical clutch has been shown in Figure 15. When traveling on the ground or on the water the helicopter wings or blades are kept in the folded position shown by broken lines in Figure 1 and by full lines in Figure 9.

When the machine is to operate as a helicopter the operator first raises the propeller blades to the position shown by full lines in Figure 1 and connects pinion 60 with gears 47 and 55. Clutch 132 is of course left in open position. After the machine has been raised by the action of blades 98U and 98L the pilot closes clutch 135 which has one part driven from the motor by sprocket chain 136. Power is transmitted by shaft 137 to gears 138 and 139 whereby propeller blades 140 are caused to rotate in opposite directions and produce a forward movement of the machine which is sustained principally by the lifting action of the helicoper blades. The machine is provided with short stabilizing wings 141 that have ailerons 142 that are controllable from the pilot seat.

When the machine is to be operated as an ordinary monoplane the helicopter blades are arranged transversely as shown by broken lines in Figures 9 and 10. The traction propeller 140 is now employed and the machine operates as an airplane. The helicopter blades 98 are provided with ailerons 143 that are adjustable during flight. The means for effecting this adjustment comprises a Selsyn remote control which operates in a well understood manner. In Figure 4 a multiple conductor cable 144 has been shown extending upwardly through tubular member 43. The upper end of cable 144 extends radially through cap 64. The six conductors terminate in slip rings 145. Hub 70 has been provided with three brushes 146 that engage the three inner slip rings. Conductors 147 extend to the Selsyn motor that controls aileron 143. Hub 70 carries three pairs of brushes 148. The upper brushes of each pair engage the outer three slip rings while the lower brushes engage slip rings 149 on hub 77. Wires 150 connect with the motor that controls the aileron on blade 98L. The slack in cable 144 is taken up by a drum 151 or similar device.

Attention is called to the lifting blades 98U and 98L which are wide and are provided along their trailing edges with ailerons 143 that are adjustable during flight.

The angle of attack of the blades is manually controlled by the worm gear 83, 84 (Figure 4) by means of which they are set at what is considered to be the optimum angle.

When the blades are rotating the ailerons may be adjusted to change the effective angle of attack.

When the machine is to function as a helicopter the lifting blades are rotated to raise the machine from the supporting surface. If the machine is to move vertically the lifting blades alone are used. The rate at which the machine is raised can be varied by changing the angle of the ailerons. If the machine is to be elevated while moving horizontally the angle of the path can be changed by means of the ailerons which supplement the main lifting blades.

Attention is called to the fact that since the two wings that also serve as lifting propellers, rotate in opposite directions and are provided with independently adjustable ailerons the vehicle may be turned in flight by proper adjustment of the ailerons. If the aileron on the wing that rotates clockwise, when viewed from above, is dropped from level position vehicle will turn towards the left and if the aileron on the other wing is dropped down the vehicle will turn towards the right. The characteristic of the vehicle to turn to the left or right while operating as a helicopter makes it very maneuverable.

It is, of course, to be understood that the usual and necessary elements are to be provided, such as gas tanks, which have been omitted in the interest of clarity.

Having described the invention, what I claim as new is:

1. A combined land, water and air vehicle comprising an elongated wheel mounted frame, an engine carried by the frame, the front end of the frame having a traction propeller rotatable on a horizontal axis, means for driving the propeller by power from the engine, at least one of the wheels being a drive wheel, means for driving said wheel by power from the engine, a vertical stationary tubular member attached at its lower end to the frame, two relatively rotatable tubular members concentric with the stationary tubular member, a helicopter blade connected with each of the relatively rotatable tubular members at vertically spaced points, means for turning the last named tubular members in opposite directions by power derived from the engine and means comprising clutches for selectively connecting the engine to the traction propeller or to the relatively rotatable tubular members or to both to effect either separate or simultaneous operations.

2. A vehicle in accordance with claim 1 in which the helicopter blades are mounted on hubs outwardly projecting trunnions for axial adjustment and in which each blade has a worm gear device for effecting the adjustment.

3. A vehicle in accordance with claim 1 in which the two helicopter hubs and blades are vertically adjustable with respect to the frame.

4. A device in accordance with claim 1 in which the helicopter blades have their following edges provided with adjustable ailerons and in which electrical means comprising a multiconductor cable extending upwardly through the two innermost tubular members is provided for adjusting the angular position of the ailerons while the blades rotate.

5. In an aircraft having an elongated wheel mounted frame and an engine carried thereby, a blade operating mechanism comprising, a stationary tube supported on the frame in vertical position, the outer surface of said tube being splined, a second tube telescopically connected with the first tube extending upwardly therefrom, the inner surface of the second tube being splined for cooperative engagement with the splines in the first tube, the outer surface of said second tube having threads, a third tube rotatably connected at its lower end with the first tube adjacent its lower end, the inner surface of said third tube having internal threads for cooperative engagement with the threads on the outer surface of the second tube, means for rotating the third tube by power from the engine, whereby said second tube will be raised and lowered, two helicopter blade hubs supported from the upper end of the second tube for independent rotation, and means for turning the hubs simultaneously in opposite directions about a vertical axis.

6. A device in accordance with claim 5 in which the upper of the two hubs is connected to the top of the second tubular member and the second hub is positioned below the first hub and connected therewith for relative rotation, and in which a tubular shaft is connected with each hub, the shaft connected with the upper hub being within the shaft connected with the lower hub, said shafts having their lower ends provided with bevel gears of equal size, facing each other, and a rotatable drive pinion in operative engagement with the bevel gears.

7. A device in accordance with claim 5 in which each hub has a helicopter blade secured thereto for axial rotary adjustment and projecting radially therefrom.

8. A device in accordance with claim 5 in which a cap is secured to the top of the second tubular member and provided on its under surface with six concentric slip rings and in which a cable having six insulated conductors extends through the two first mentioned tubes, each conductor being connected with a slip ring.

9. A device in accordance with claim 5 in which each blade has its following edge provided with an adjustable aileron and in which means comprising a selsyn motor and motor control is provided for adjusting the ailerons.

10. An aircraft of the helicopter type having an elongated wheel supported frame and an engine carried by the frame, a helicopter blade support and operating mechanism, comprising, a tubular member having its lower end attached to the frame, the outer surface of said tube being fluted forming longitudinal splines, a second tubular member telescopically connected with the first, the inner surface of the second member being splined for cooperative engagement with the splined outer surface of the first tubular member, the outer surface of the second tubular member having threads, a round cap attached to the upper end of said second member, the lower end of the first tubular member having an antifriction bearing, a third tubular member having its lower end operatively connected with said bearing, a section of the inner surface of said third tubular member being provided near its upper end with threads in operative engagement with the threads on the outer surface of the second tubular member, means for turning the third tubular member, by power from the engine, to move the second tubular member in a vertical direction, an annular base surrounding the lower end of said third tubular member, a helicopter hub connected with the upper end of the said second tubular member for rotation thereabout, a second helicopter hub positioned beneath the first and rotatably connected thereto, a beveled ring gear mounted on the upper end of the annular base, a fourth tubular member extending upwardly from said gear, the inner surface of said fourth tubular member being provided with longitudinal splines, a fifth tubular member with its upper end attached to the upper hub, the outer surface of said fifth tubular member having splines for operative sliding engagement with the splines on the inner surface of the fourth tubular member, a bevel ring gear mounted for rotation on the lower end of the said fourth tubular member, a sixth tubular member extending upwardly from the said second bevel ring gear, the inner surface of said sixth tubular member being splined, a seventh tubular member having its upper end connected with the lower hub and provided on its outer surface with splines for operative sliding engagement with the splines on the inner surface of said sixth tubular member, a bevel pinion in operative engagement with the bevel ring gears, mounted for rotation by power from the engine for effecting a simultaneous rotation of the hubs in opposite direction, and a helicopter blade attached to and projecting radially from each hub.

JAMES EIDSON GRIFFITH.

REFERENCES CITED

The following references are of record in the file of this patent:

UNITED STATES PATENTS

| Number | Name | Date |
|---|---|---|
| 1,331,221 | Swanson | Feb. 17, 1920 |
| 1,503,950 | Heywood | Aug. 5, 1924 |
| 1,689,083 | Ringel | Oct. 23, 1928 |
| 1,738,010 | Klinker | Dec. 3, 1929 |
| 1,855,084 | Alvistur | Apr. 19, 1932 |
| 1,877,902 | Kuethe | Sept. 20, 1932 |
| 1,983,171 | Harding | Dec. 4, 1934 |

FOREIGN PATENTS

| Number | Country | Date |
|---|---|---|
| 293,587 | Great Britain | July 12, 1928 |